Feb. 26, 1935.  W. GEDNEY  1,992,820
POWER LAWN MOWER AND VACUUM COLLECTING MEANS
Filed Jan. 3, 1933   2 Sheets-Sheet 1
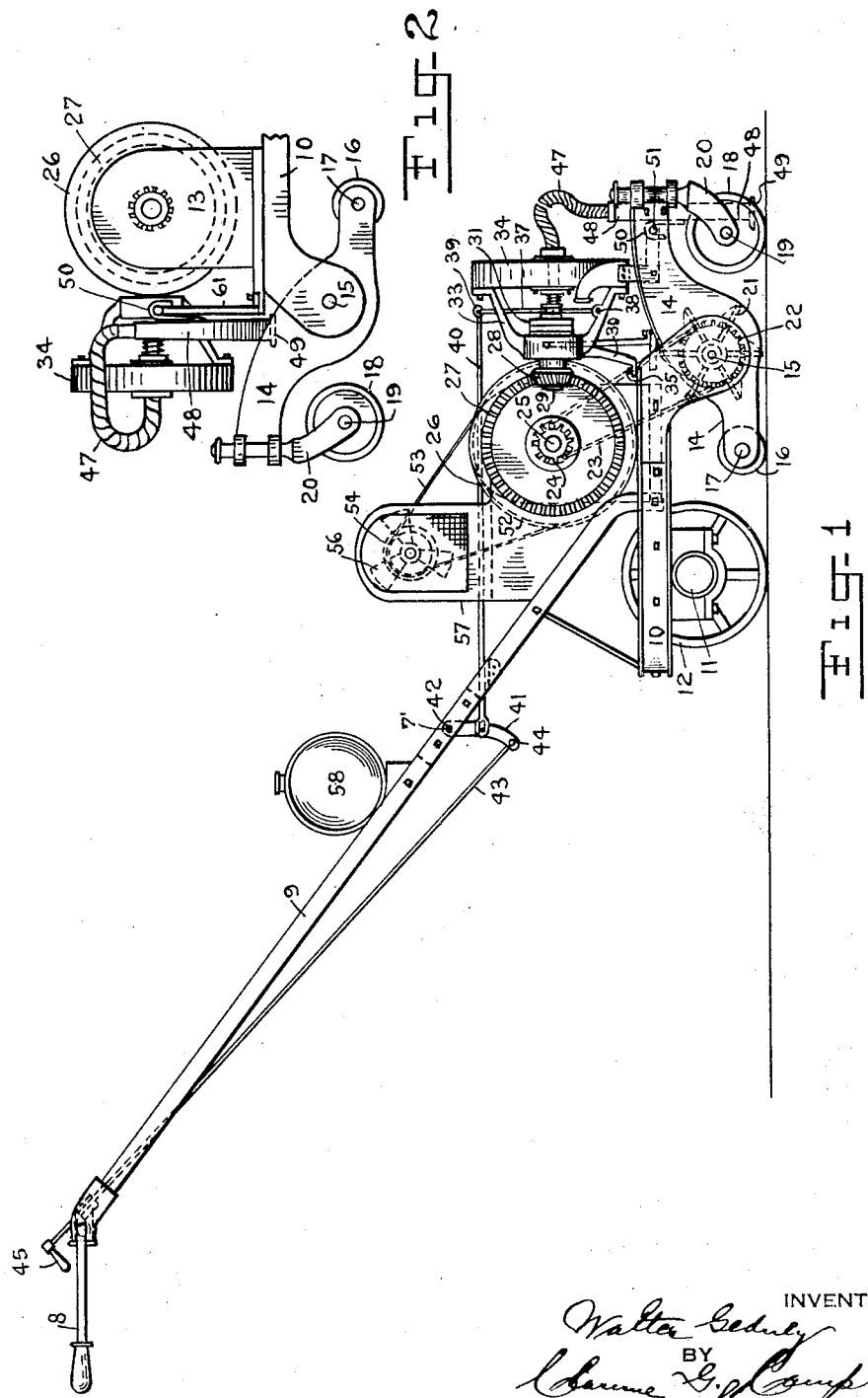
INVENTOR-
Walter Gedney
BY
ATTORNEY- Feb. 26, 1935. W. GEDNEY 1,992,820
POWER LAWN MOWER AND VACUUM COLLECTING MEANS
Filed Jan. 3, 1933 2 Sheets-Sheet 2

Patented Feb. 26, 1935

1,992,820

UNITED STATES PATENT OFFICE 1,992,820

POWER LAWN MOWER AND VACUUM COLLECTING MEANS

Walter Gedney, Newburgh, N. Y., assignor of one-half to William J. Hogarth, Newburgh, N. Y.

Application January 3, 1933, Serial No. 649,846

4 Claims. (Cl. 56—23)

My invention relates to an improvement in the combination of a power lawn mower and vacuum collecting means and its novelty consists in the combination, adaptation and arrangement of parts as will be more fully hereinafter pointed out.

In mowing fine lawns and putting greens of golf links it is a constant problem to keep the turf clean so that the cut grass, dead leaves and other waste matter peculiar to lawns should not be matted into and rolled into the lawn as the lawn is cut by a mower. This problem is particularly acute with respect to the use of a power lawn mower which is very much heavier than the ordinary lawn mower and in which the driving roller or rollers are required to smooth out and tamp the lawn at the same time that the mower goes over it for the purpose of cutting the grass.

My device solves this problem, furnishing a machine which by power is adapted to cut the lawn in a perfect manner and gather in a suction cleaning device the cut grass, dead leaves and other waste matter found on lawns so that when the roller passes over the clipped lawn it will find an absolutely clean lawn which can properly be rolled and tamped to an absolutely smooth condition free of any matter except the turf. This solution of this problem is of unusual importance in view of the constantly increasing number of large golf links, parks and fine private estates where the tremendous area of turf to be kept in condition requires the use of a power lawn mower to cut it at least twice a week, as this is essential in keeping the turf in a healthy growing properly trimmed condition.

Referring to the drawings Figure 1 is a side elevation of my complete device looking at it from the right hand side as the operator stands operating it from the handles as shown.

Figure 2 is a side elevation looking at the same device from the left hand side and showing only the front portion with the vacuum nozzle in position to collect the grass as it is cut.

Figure 3:
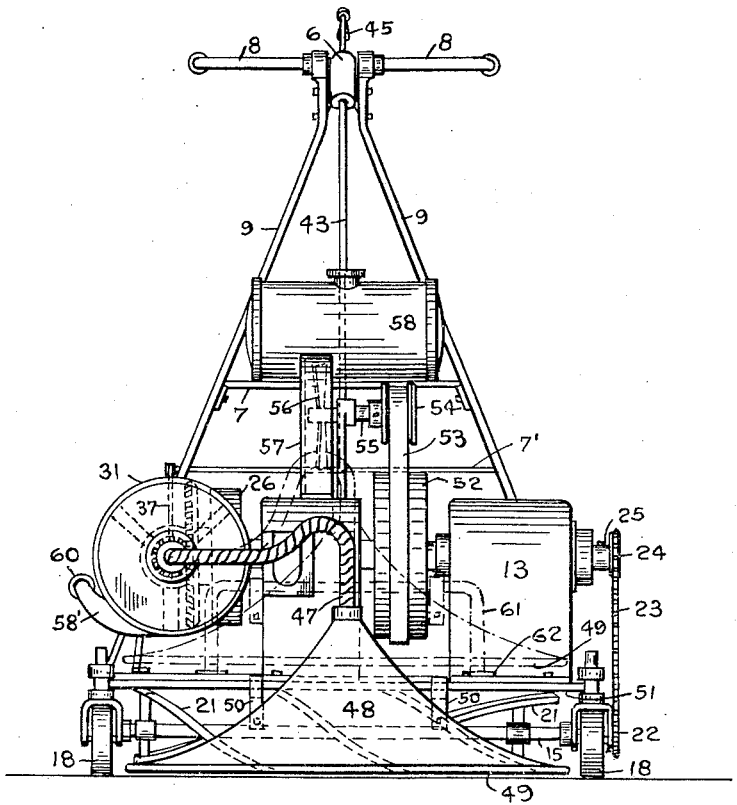
Figure 3 is a front elevation of my device as shown in Figure 1 and showing the vacuum nozzle in dotted outline in the position shown in Figure 2.
Figure 4:
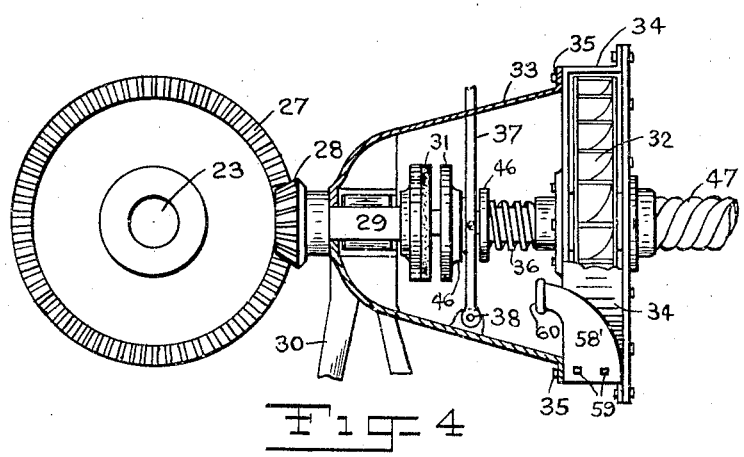
Figure 4 is a detail of the driving mechanism for the suction fan with the rest of the device broken away for convenience in illustration.

In the drawings 10 is the main frame in which is mounted on tapered roller bearings in the usual way at 11 a pair of driving rollers 12 and which are driven by means of a gasoline motor 13 of usual construction and in the usual and well known manner, but the detail of which is not shown herein. A pair of bars 9 are rigidly secured to each side of the frame 10 and terminate at their upper ends in handle bars 8 and have a tie rod 7 connecting them together.

A free floating cutting unit 14 is pivoted on said frame 10 at 15 and has a roller 16 at one end rotatably mounted therein at 17 in the usual manner and is supported at the opposite end by a pair of wheels 18 rotatably mounted in the usual manner at 19 on castors 20. The six blade revolving cutter 21 is also mounted on its central shaft at 15 and through sprocket gear 22 rigidly connected thereto said cutter 21 is rotated by means of chain 23 which runs over sprocket gear 24 which is mounted over shaft 25 of the motor 13 on which shaft 25 is also mounted a fly wheel 26 and pulley gear 27 so that it also rotates with said shaft 25.

Bevel gear 28 mounted on shaft 29 which is mounted in frame 30 and which is rigidly secured on frame 10 is connected through clutch 31 of usual plate clutch construction, transfers by meshing with pulley gear 27, the motion from said fly wheel 26 to suction fan 32. A subframe 33 is mounted over said shaft 29 and is secured at 35 to a suction fan box 34 which contains said suction fan 32. A spring 36 is mounted over the shaft 29 adjacent to said suction fan box 34 and is adapted to maintain the clutch plates 31 in engagement except as they are disengaged by the lever 37 pivoted at 38 and connected at 39 by rod 40, which motion is transferred through bell crank lever 41 pivoted at 42 on tie rod 7' and having a rod 43 connected at 44 running through a spacer member 6 which is rigidly mounted between the upper ends of bars 9 and handle bars 8 and having a handle 45 rigidly secured thereto. By pushing the handle 45 downwardly the motion will be transferred through rod 43, bell crank lever 41 thereby pushing rod 40 so that the lever 37 pivoted at 38 is pushed backwardly whereby through passing between the flanges 46 of one of the clutch plates of the clutch 31 mounted on the shaft 29 the spring 36 will thereby be compressed and separate the clutch plates of the clutch 31.

Flexible tubing 47 is connected to the suction fan box 34 in the usual well known manner and has a suction nozzle 48 with a suction slot 49 of usual construction and the suction nozzle 48 has hooks 50 rigidly secured thereto which are adapted to be hooked over the tie rod 51 of the full floating cutting unit 14.

A pulley 52 is mounted on shaft 25 over which a belt 53 transfers the power to a smaller pulley 54 mounted on a shaft 55 on the other end of which is mounted a fan 56 of usual construction to cool the water in the radiator 57 from the motor 13 in the usual well known manner. A tank 58 is mounted on the bars 9 and tie rod 7 in the usual well known manner and is adapted to be filled with gasoline to feed the motor 13.

A chute 58' is directly connected through the fan box 34 at 59 so as to connect with the inside of the suction fan box 34 to receive the material collected therein by the fan 32 and this ends at its upper end in a circular flanged mouth 60 to which is adapted to be secured a bag or other receptacle to receive the leaves, grass and other waste matter picked up by the suction fan 32. Such bags when sufficiently full can be readily tied at their tops and removed from said mouth 60 and a new bag secured thereto. In this way the operator can cover a tremendous area leaving the tied up bags only to be gathered later containing the grass, leaves and other waste matter.

The vacuum nozzle 48 is shown in Figures 1 and 3 suspended by the hooks 50 over the tie rod 51. In Figure 2 and in dotted outline in Figure 3 the vacuum nozzle 48 is suspended by the hooks 50 over the U rod 61 which is supported in its upright position rigidly on the frame 10 at 62 so that the suction slot 49 is immediately above the blades of the revolving cutter 21 whereby it will suck up the grass as it is cut through the slot 49, nozzle 48, flexible pipe 47, into the fan box 34 and the suction fan 32, thence through the chute 58', mouth 60 into the bag secured thereto but which is not shown herein.

As the full floating cutting unit 14 maintains the revolving cutter 21 at a uniform distance from the ground under any and all conditions whether the mower be going up or down hill or on uneven ground, so also will the nozzle 48 and the slot 49 be maintained at a uniform distance from the ground under any and all conditions as it is supported on the cutting unit 14 on the tie rod 51.

It will be understood that this complete power lawn mower has the usual speed control means for low, medium and high speed in driving the driving rollers 12 controlled in the usual well known manner on the handles 8 but not shown herein in order to avoid confusion in illustration.

In operating my device when the motor has been set in operation, the clutch 31 being disengaged by means of pressing down on the handle 45 which through rod 43, bell crank lever 41, rod 40, connection 39 to the rod 37 pivoted at 38, said rod 37 passing between the flanges 46 will pull one of the clutch plates 31 away from the other clutch plate 31 thereby cutting off the transfer of the power coming through pulley gear 27, bevel gear 28, shaft 29 and the first clutch plate 31. As the power lawn mower is run on to turf where it is desired to use the vacuum collecting means the lever 41 will be pulled upwardly whereby the spring 36 will thrust against the clutch plate 31 to reestablish the operation of the complete shaft 29 and the vacuum fan 32 whereby the suction established through pipe 47 and the nozzle 48 at the slot 49 will draw in leaves, grass or other waste matter, then carrying it up through nozzle 48, pipe 47 into the suction fan 32 which will blow it out through the chute 58' to the container secured to the mouth 60. It will be found desirable to throw out the cutch 31 as described when the power lawn mower and vacuum collecting means are passing over gravel or other dirt or crushed stone ground before passing on to the turf which is to be cut and cleaned, as otherwise sand, stone and loose dirt which is not desired will be gathered up by the vacuum collecting means.

When only the grass being cut is desired to be taken up by the vacuum collecting means, the nozzle 47 is suspended on the U rod 61 so that the slot 49 will be immediately adjacent to the revolving blades of the cutter 21 so as to draw in all of the grass as rapidly as it is cut thereby leaving the lawn and turf free of any cut grass as my device is run over the same.

It will be apparent that through the usual clutch control, not shown herein, the driving connections to the cutter 21 may be disconnected when the vacuum nozzle 48 is in the position as shown in Figures 1 and 3 when it may be desired to only collect the leaves, dead grass or other waste matter on the turf in the spring and fall when it is not necessary to cut the grass at the same time.

All of the advantages of the usual power lawn mower are found in my device enabling the operator to give his attention entirely to directing the machine along the exact path desired without having to put any effort into pushing the machine which is driven of its own power, and the cutter 21 also being rotated by means of the same power so that the machine will travel uniformly securing the best possible cutting results.

To all of these advantages must be added the unusual advantage of having the exact path over which the cutter is to pass absolutely clean and the grass which may have been blown over or matted down slightly through wind or rain or other cause, pulled up to its full standing position by the vacuum of the nozzle 48 through the operation of the suction fan 32 as described so that the cutter 21 has uniform free standing grass to cut whereby the uniformity of the cutting will be tremendously increased over what has been possible heretofore.

My device is adapted to be combined with any of the standard makes of power lawn mowers and the particular means shown is only indicative of many variations which may be made therein without departing from the spirit and intent of this invention.

I claim:

1. In a power lawn mower having a power motor unit and a free floating cutter unit pivoted thereon, the latter carrying a revolving cutter driven from the shaft of the motor of said power unit, vacuum means for collecting leaves, grass and other waste matter in advance of the cutting operation comprising a starting pulley with gear attached, secured to the fly wheel of the power motor, a gear on the outer end of the shaft of said vacuum means meshing with said pulley gear and a suction fan on the opposite end of said shaft to which is connected a vacuum nozzle by a flexible pipe connection.

2. In a power lawn mower having a power motor unit and a free floating cutter unit pivoted thereon, the latter carrying a revolving cutter driven from the shaft of the motor of said power unit, vacuum means for collecting leaves, grass and other waste matter comprising a starting pulley with gear attached, secured to the fly wheel of the power motor, a gear on the outer end of the shaft of said vacuum means meshing with said pulley gear and a suction fan on the opposite end of said shaft to which is connected a vacuum nozzle by a flexible pipe connection and which nozzle is adapted to be suspended on the front of said cutter unit to collect said leaves, grass and other waste matter prior to the cutting operation.

3. In a power lawn mower having a power motor unit and a free floating cutter unit pivoted thereon, the latter carrying a revolving cutter driven from the shaft of the motor of said power unit, vacuum means for collecting leaves, grass and other waste matter prior to the cutting operation comprising a starting pulley with gear attached, secured to the fly wheel of the power motor, a gear on the outer end of the shaft of said vacuum means meshing with said pulley gear and a suction fan on the opposite end of said shaft to which is connected a vacuum nozzle by a flexible pipe connection and which nozzle is adapted to be suspended on said mower in front of the cutter so as to remain at a uniform distance from the ground.

4. In a power lawn mower having a power motor unit and a free floating cutter unit pivoted thereon, the latter carrying a revolving cutter driven from the shaft of the motor of said power unit, vacuum means for collecting leaves, grass and other waste matter comprising a starting pulley with gear attached, secured to the fly wheel of the power motor, a gear on the outer end of the shaft of said vacuum means meshing with said pulley gear and a suction fan on the opposite end of said shaft to which is connected a vacuum nozzle by a flexible pipe connection and which nozzle is adapted to be suspended above the cutting knives of the cutter so as to suck up the grass as it is cut and in front of the cutter for collecting in advance of the mowing operation.

WALTER GEDNEY.